United States Patent

Fukushima et al.

[11] Patent Number: 5,646,399
[45] Date of Patent: Jul. 8, 1997

[54] TUNABLE OPTICAL FILTER HAVING BEAM SPLITTER AND MOVABLE FILM FILTER

[75] Inventors: Nobuhiro Fukushima; Hiroshi Onaka, both of Kawasaki, Japan

[73] Assignee: Fujitsu Limited, Kanagawa, Japan

[21] Appl. No.: 593,211

[22] Filed: Jan. 29, 1996

[30] Foreign Application Priority Data

Aug. 28, 1995 [JP] Japan .................. 7-218408

[51] Int. Cl.$^6$ .................. H01J 40/14
[52] U.S. Cl. .................. 250/226; 359/889
[58] Field of Search .................. 359/326, 568, 359/889; 385/37; 356/395; 250/226

[56] References Cited

U.S. PATENT DOCUMENTS

| | | | |
|---|---|---|---|
| 4,508,964 | 4/1985 | Gunning III et al. | 250/201 |
| 4,776,669 | 10/1988 | Dammann et al. | 350/162.19 |
| 5,214,494 | 5/1993 | Inaba et al. | 356/419 |
| 5,504,608 | 4/1996 | Neeves et al. | 359/124 |

FOREIGN PATENT DOCUMENTS 62-103587  5/1987  Japan .

Primary Examiner—Edward P. Westin
Assistant Examiner—Alan L. Giles
Attorney, Agent, or Firm—Helfgott & Karas, P.C.

[57] ABSTRACT

A tunable filter module which can automatically make the center wavelength in the passband coincident with the center wavelength of a signal light beam according to variations in wavelength of the signal light beam. The tunable filter module includes a beam splitting mechanism for splitting an incident signal light beam into a first beam undeviated, a second beam deflected to one side of the first beam; and a third beam deflected to another side of the first beam, and a multilayer film filter located so as to transmit the first, second, and third beams. A first photodetector is located so as to detect the second beam, and a second photodetector is located so as to detect the third beam. A comparator is connected to the first and second photodetectors to compare outputs from the first and second photodetectors and output a differential signal indicative of the difference between these outputs. A tilt angle of the multilayer film filter is changed according to the differential signal so that the center wavelength in the passband of the multilayer film filter comes into coincidence with the center wavelength of the signal light beam.

15 Claims, 9 Drawing Sheets

TUNABLE OPTICAL FILTER HAVING BEAM SPLITTER AND MOVABLE FILM FILTER

BACKGROUND OF THE INVENTION

1. Field of the Invention

The present invention relates generally to a tunable filter module which can vary the center wavelength in its passband, and more particularly to a tunable filter module which can automatically control the center wavelength in its passband to the center wavelength of input light according to variations in wavelength of the input light.

2. Description of the Related Art

Attention is now being given to a wavelength multiplexing transmission system for transmitting many optical signals having different wavelengths by the use of a single optical fiber as a system capable of obtaining a very large transmission capacity and a high cost performance. In general, the wavelength multiplexing transmission system employs a filter for passing signal light having object wavelengths to a receiving side and cutting off light having the other wavelengths.

In general, it is preferable that an optical filter has a narrow passband of wavelengths. However, the wavelengths of signal light vary with temperature changes or aged deterioration of a light source on the transmitting side of an optical communication system. Therefore, in the case that the passband of an optical filter to be used is too narrow, there is a possibility that signal light may also be cut off by the optical filter. To realize a system for controlling the center wavelength in the passband of the optical filter in response to a change in wavelength of the signal light, a tunable filter module capable of varying the center wavelength in its passband has now been desired.

Conventionally known is a tunable filter module which can vary the center wavelength in its passband by mechanically changing the angle of incidence on an optical interference film or a diffraction grating. In such a conventional tunable filter module, if the set wavelength of the tunable filter module (the center wavelength in the passband of the tunable filter module) deviates from the center wavelength of the signal light, it is necessary to correct the set wavelength of the tunable filter module to a shorter-wavelength side or a longer-wavelength side. However, the direction of correction of the set wavelength cannot be determined.

To cope with this, the set wavelength of the tunable filter module is conventionally varied with a given period, and the intensity of transmitted light is monitored to obtain the center wavelength in the passband. However, such a periodic change in the set wavelength of the filter module causes an adverse effect on signal light such as variations in intensity of the signal light, thus increasing an error rate. Further, other defects include time consumption in an operation for finding out the center wavelength in the passband and complexity of a control system.

SUMMARY OF THE INVENTION

It is therefore an object of the present invention to provide a tunable filter module which can automatically control the center wavelength in the passband of the module to the center wavelength of signal light according to variations in wavelength of the signal light.

In accordance with an aspect of the present invention, there is provided a tunable filter module comprising beam splitting means for splitting an incident signal light beam into a first beam undeviated, a second beam deflected to one side of the first beam, and a third beam deflected to another side of the first beam; a multilayer film filter located so as to transmit the first beam, the second beam, and the third beam; a first photodetector located so as to detect the second beam; a second photodetector located so as to detect the third beam; a comparator connected to the first and second detectors, for comparing outputs from the first and second detectors and outputting a differential signal indicative of a difference between the outputs; an actuator for moving the multilayer film filter; and driving means for driving the actuator according to the differential signal so that a center wavelength in a passband of the multilayer film filter comes into coincidence with a center wavelength of the signal light beam.

Preferably, the beam splitting means comprises a transmission type diffraction grating. Alternatively, the beam splitting means may comprise a pair of birefringent wedge plates having the same wedge angle and located so that the wedges of the wedge plates are oriented in opposite directions.

In accordance with another aspect of the present invention, there is provided a tunable filter module comprising beam splitting means for splitting an incident signal light beam into a first beam undeviated, a second beam deflected to one side of the first beam, and a third beam deflected to another side of the first beam; a Fabry-Perot interferometer located obliquely with respect to an optical path of the signal light beam so as to transmit the first beam, the second beam, and the third beam; a first photodetector located so as to detect the second beam; a second photodetector located so as to detect the third beam; a comparator connected to the first and second detectors, for comparing outputs from the first and second detectors and outputting a differential signal indicative of a difference between the outputs; an actuator for changing a tilt angle of the Fabry-Perot interferometer with respect to the optical path; and driving means for driving the actuator according to the differential signal so that a center wavelength in a passband of the Fabry-Perot interferometer comes into coincidence with a center wavelength of the signal light beam.

The first photodetector detects the intensity of the second beam to output an electrical signal corresponding to the intensity of the second beam. On the other hand, the second photodetector detects the intensity of the third beam to output an electrical signal corresponding to the intensity of the third beam. The outputs from the first and second photodetectors are compared by the comparator, and a differential signal indicative of the difference between the outputs is generated from the comparator to the driving means. The driving means drives the actuator according to the differential signal generated from the comparator so that the center wavelength in the passband of the multilayer film filter comes into coincidence with the center wavelength of the signal light beam.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
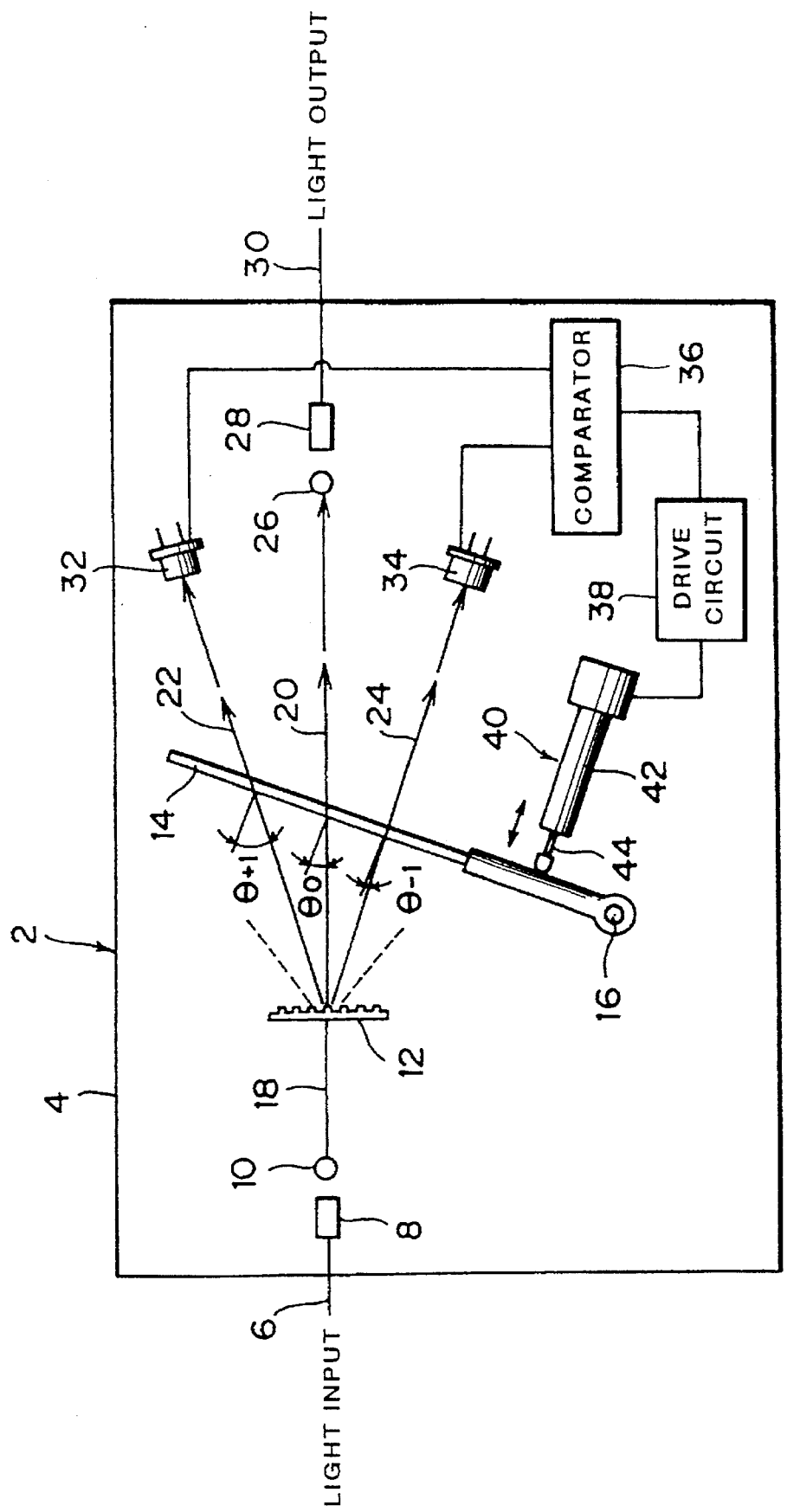
FIG. 1 is a schematic illustration of a first preferred embodiment of the present invention.

Referring to FIG. 1, there is shown a schematic illustration of a tunable filter module 2 according to a first preferred embodiment of the present invention. Throughout this specification, substantially the same parts are denoted by the same reference numerals. Reference numeral 4 denotes a case or base of the tunable filter module 2. A ferrule 8 connected to an input optical fiber 6 is fixed to the case 4. Signal light emerged from the input optical fiber 6 is collimated by a lens 10, and a collimated signal light beam 18 is incident on a transmission type diffraction grating 12.

The signal light beam 18 is split by the diffraction grating 12 into a zero-order light beam, or principal signal light beam 20 undeviated after transmission, a plus first-order diffracted light beam 22 deviated to the upper side of the zero-order light beam 20 after transmission as viewed in FIG. 1, and a minus first-order diffracted light beam 24 deviated to the lower side of the zero-order light beam 20 after transmission as viewed in FIG. 1. Here, since higher-order (plus and minus second-order etc.) diffracted light beams have small intensities, it is easy to design the diffraction grating 12 so as to neglect such higher-order diffracted light beams.

For example, the diffraction grating 12 is designed so that the intensity of the zero-order light beam 20 becomes about 96%, the intensities of the plus and minus first-order diffracted light beams 22 and 24 become 2% for each, and the intensities of the other higher-order diffracted light beams become 0.1% or less. In this case, an increase in loss which a principal signal port undergoes due to placement of the diffraction grating 12 is 0.2 dB. Further, it is sufficient that the diffraction grating 12 has about 100 grooves per millimeter. Thus, the diffraction grating 12 can be manufactured at a low cost, and the dependence of a diffraction angle upon wavelengths can also be reduced.

Reference numeral 14 denotes a dielectric multilayer film filter, which is pivotably mounted about a pivot shaft 16. The principal signal light beam 20 enters the dielectric multilayer film filter 14 at an incidence angle $\theta_0$. The plus first-order diffracted light beam 22 enters the dielectric multilayer film filter 14 at an incidence angle $\theta_{+1}$ greater than the incidence angle $\theta_0$ of the principal signal light beam 20. The minus first-order diffracted light beam 24 enters the dielectric multilayer film filter 14 at an incidence angle $\theta_{-1}$ smaller than the incidence angle $\theta_0$ of the principal signal light beam 20.

Figure 2:
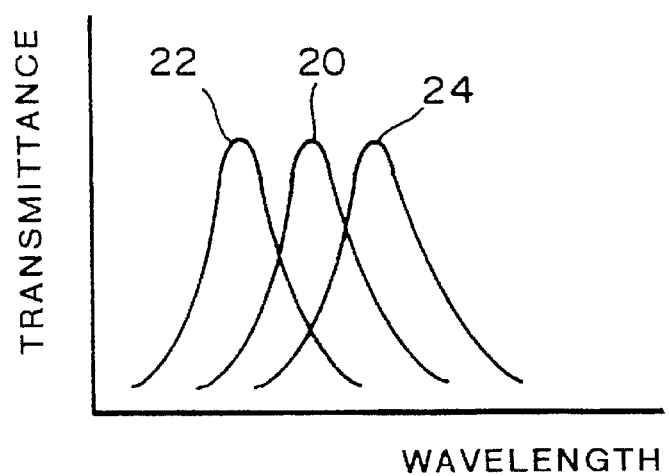
FIG. 2 is a graph showing the relation between wavelength and transmittance of plus first-order diffracted light, zero-order light, and minus first-order diffracted light.

Accordingly, the plus first-order diffracted light beam 22 having wavelengths shorter than those of the principal signal light beam 20 passes through the dielectric multilayer film filter 14, and the minus first-order diffracted light beam 24 having wavelengths longer than those of the principal signal light beam 20 passes through the dielectric multilayer film filter 14. This relation is shown in FIG. 2. The plus first-order diffracted light beam 22 is detected by a photodiode 32, and the minus first-order diffracted light beam 24 is detected by a photodiode 34. The principal signal light beam 20 passed through the dielectric multilayer film filter 14 is coupled to an output optical fiber 30 by a lens 26. Reference numeral 28 denotes a ferrule connected to the output optical fiber 30 and fixed to the case 4.

Thus, the diffracted light emerged from the diffraction grating 12, that is, the plus first-order diffracted light beam 22 and the minus first-order diffracted light beam 24 are respectively detected by the photodiodes 32 and 34. Therefore, variations in diffraction angle with wavelengths are allowed if the variations are minute. That is, the photodiodes 32 and 34 are designed so that their light detection diameters are larger than the positional slips of the beams due to the variations in diffraction angle.

The photodiodes 32 and 34 are connected to a comparator 36. The comparator 36 compares the intensities of the plus first-order diffracted light beam 22 and the minus first-order diffracted light beam 24. When the intensity of the plus first-order diffracted light beam 22 is larger than the intensity of the minus first-order diffracted light beam 24, this result shows that the center wavelength in the passband of the dielectric multilayer film filter 14 is shorter than the center wavelength of the signal light beam 18, whereas when the intensity of the minus first-order diffracted light beam 24 is larger than the intensity of the plus first-order diffracted light beam 22, this result shows that the center wavelength in the passband of the dielectric multilayer film filter 14 is longer than the center wavelength of the signal light beam 18.

An output from the comparator 36 is input into a drive circuit 38 for driving a microactuator 40. The microactuator 40 has a cylinder 42 and a piston 44 slidable with respect to the cylinder 42. The piston 42 is in contact with the dielectric multilayer film filter 14. Accordingly, the drive circuit 38 drives the microactuator 40 according to a differential signal indicative of the difference between the intensity of the plus first-order diffracted light beam 22 and the intensity of the minus first-order diffracted light beam 24, which signal is output from the comparator 36, thereby changing the tilt angle of the dielectric multilayer film filter 14 so that the center wavelength in the passband of the dielectric multilayer film filter 14 comes into coincidence with the center wavelength of the signal light beam 18.

While the above preferred embodiment has been described on the assumption that the profile of the signal light beam 18 is symmetrical with respect to the center thereof, an actual signal light beam is nearly symmetrical with respect to the center thereof in many cases, and almost no problems may therefore occur in practical use with the above assumption. The profile of the signal light beam is detected by a spectrum analyzer, for example, before assembling the module. In the case that the profile of the signal light beam detected is unsymmetrical with respect to the center thereof, a correcting circuit according to the profile of the signal light beam may be inserted between the photodiode 32 and the comparator 36 or between the photodiode 34 and the comparator 36.

Figure 3:
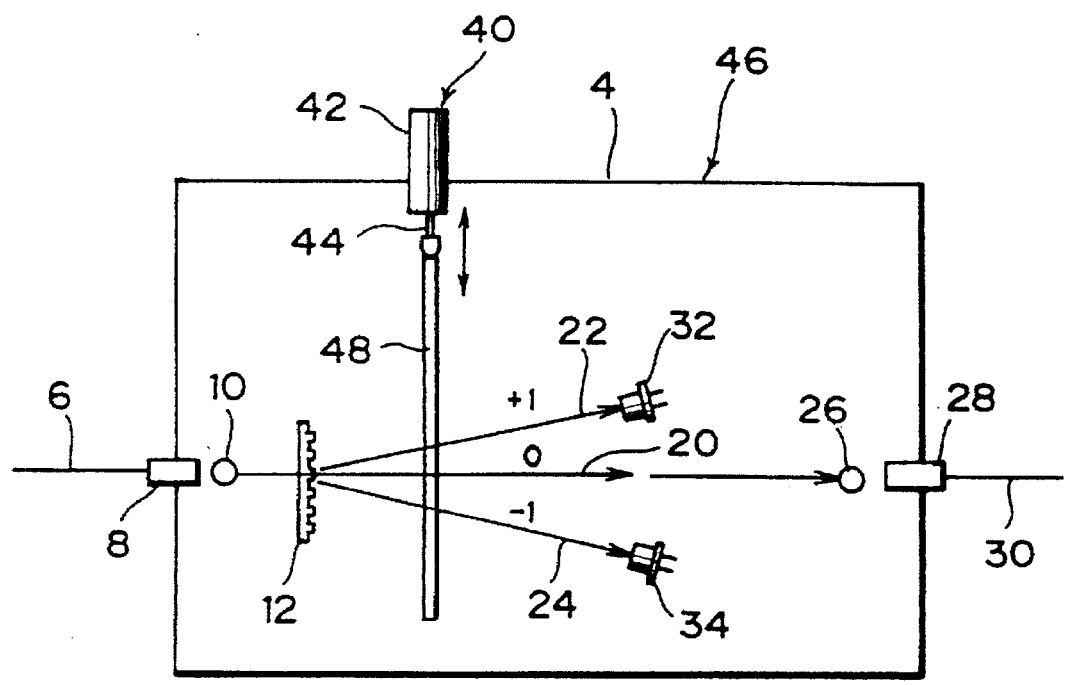
FIG. 3 is a schematic illustration of a second preferred embodiment of the present invention.
Figure 4:
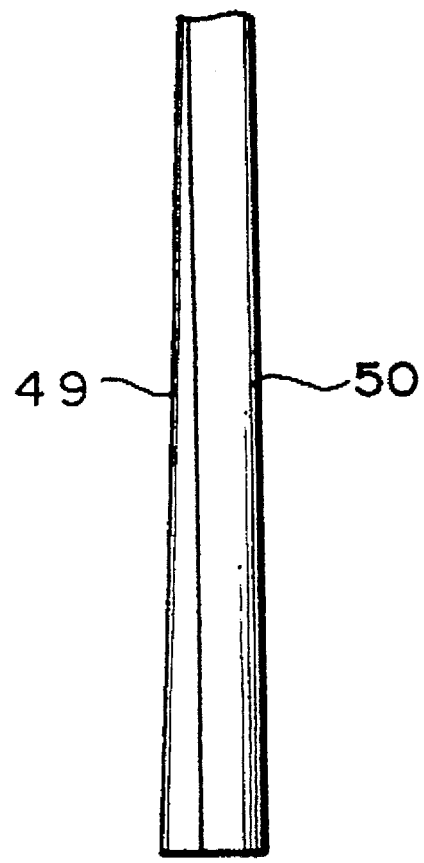
FIG. 4 is an enlarged view of a dielectric multilayer film filter used in the second preferred embodiment.

Referring to FIG. 3, there is shown a schematic illustration of a tunable filter module 46 according to a second preferred embodiment of the present invention. In this preferred embodiment, the center wavelength in the passband of a dielectric multilayer film filter 48 is changed by horizontally moving the filter 48 fabricated so that the wavelengths in the passband are continuously changed with positions of the filter 48. More specifically, as shown in FIG. 4, the thickness of a dielectric multilayer film 49 laminated on a transparent substrate 50 is continuously changed to thereby continuously change the wavelengths in the passband with positions of the filter 48.

The dielectric multilayer film filter 48 is horizontally moved by a microactuator 40 similar to that in the first preferred embodiment. Although not shown in FIG. 3, a comparator and a drive circuit respectively similar to the comparator 36 and the drive circuit 38 shown in FIG. 1 are provided also in the second preferred embodiment. The dielectric multilayer film filter 48 is so arranged that the thickness thereof is continuously increased from the upper side to the lower side as viewed in FIG. 3. With this arrangement, a plus first-order diffracted light beam 22 passes through the filter 48 at its portion having a passband of wavelengths shorter than that of a principal signal light beam 20, and a minus first-order diffracted light beam 24 passes through the filter 48 at its portion having a passband of wavelengths longer than that of the principal signal light beam 20 as similar to the first preferred embodiment.

Then, the intensities of the plus first-order diffracted light beam 22 and the minus first-order diffracted light beam 24 are respectively detected by photodetectors 32 and 34, and they are compared by the comparator (not shown). The microactuator 40 is then driven by the drive circuit (not shown) according to the difference between the intensities so that the center wavelength in the passband of the dielectric multilayer film filter 48 comes into coincidence with the center wavelength of the signal light beam. In this preferred embodiment, the angles of incidence of the plus first-order diffracted light beam 22 and the minus first-order diffracted light beam 24 upon the dielectric multilayer film filter 48 are nearly zero, so that a wavelength slip due to a change in the incidence angle is negligible.

Figure 5:
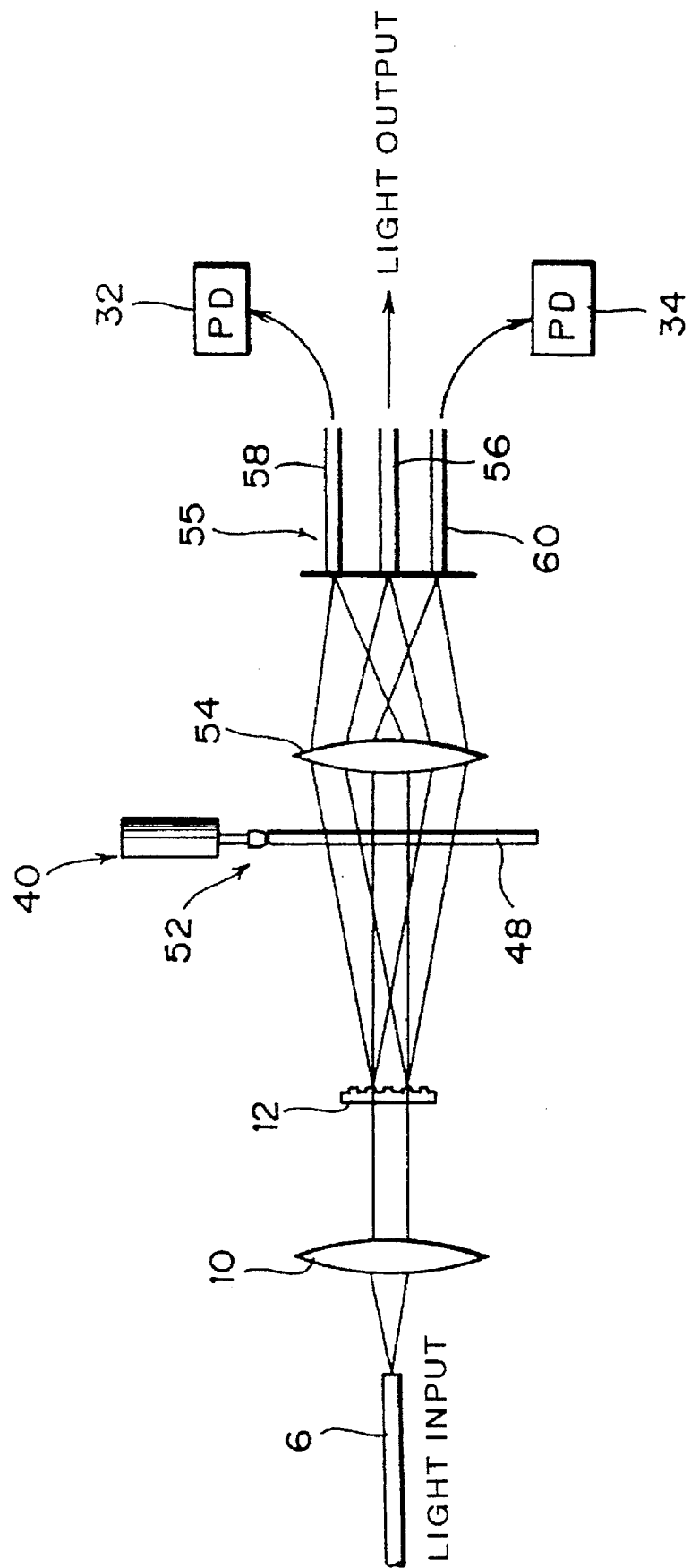
FIG. 5 is a schematic illustration of a third preferred embodiment of the present invention.

Referring to FIG. 5, there is shown a schematic illustration of a tunable filter module 52 according to a third preferred embodiment of the present invention. This preferred embodiment employs a fiber array 55 consisting of a single-mode fiber 56 and multi-mode fibers 58 and 60 located on the opposite sides of the single-mode fiber 56. The multi-mode fiber 58 is optically connected to a photodiode 32, and the multi-mode fiber 60 is optically connected to a photodiode 34.

A principal signal light beam, a plus first-order diffracted light beam, and a minus first-order diffracted light beam transmitted through a dielectric multilayer film filter 48 are respectively coupled to the single-mode fiber 56, the multi-mode fiber 58, and the multi-mode fiber 60 by a lens 54.

According to this preferred embodiment, only the optical fiber 56 for propagating the principal signal light beam is formed from a single-mode fiber, and the optical fibers 58 and 60 for respectively propagating the plus first-order diffracted light beam and the minus first-order diffracted light beam are formed from multi-mode fibers. Accordingly, the alignment of the beams by the lens 54 can be made by the central single-mode fiber 56 only. Thus, the principal signal light beam, the plus first-order diffracted light beam, and the minus first-order diffracted light beam can be easily coupled to the three fibers 56, 58, and 60, respectively, by the single lens 54.

In the first and second preferred embodiments, the plus first-order diffracted light beam 22 and the minus first-order diffracted light beam 24 are directly detected by the photodiodes 32 and 34, respectively. It is therefore necessary to ensure some distance between the filter 14 and each of the photodiodes 32 and 34 along a beam traveling direction, so as to avoid interference of the beams 22 and 24 with the principal signal light beam 20. In the third preferred embodiment, however, it is only necessary that the plus first-order diffracted light beam and the minus first-order diffracted light beam be coupled to the multi-mode fibers 58 and 60, respectively, by the lens 54. Accordingly, the whole size of the module can be made small. Although not shown in FIG. 5, this preferred embodiment also employs a comparator and a drive circuit respectively similar to the comparator 36 and the drive circuit 38 shown in FIG. 1.

Figure 6:
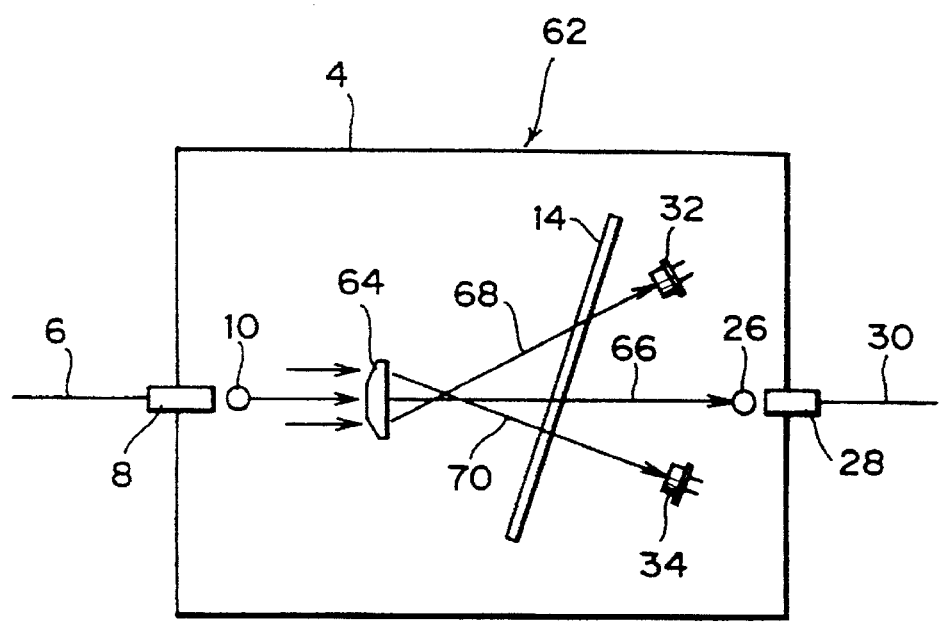
FIG. 6 is a schematic illustration of a fourth preferred embodiment of the present invention.

Referring to FIG. 6, there is shown a schematic illustration of a tunable filter module 62 according to a fourth preferred embodiment of the present invention. This preferred embodiment employs a trapezoidal prism 64 having a predetermined size in relation to the beam diameter of a signal light beam to split the signal light beam into three components. The other configuration in this preferred embodiment is similar to that in the first preferred embodiment shown in FIG. 1. Although not shown in FIG. 4, this preferred embodiment also employs a comparator, a drive circuit, and a microactuator respectively similar to the comparator 36, the drive circuit 38, and the microactuator 40 shown in FIG. 1.

Figure 7:
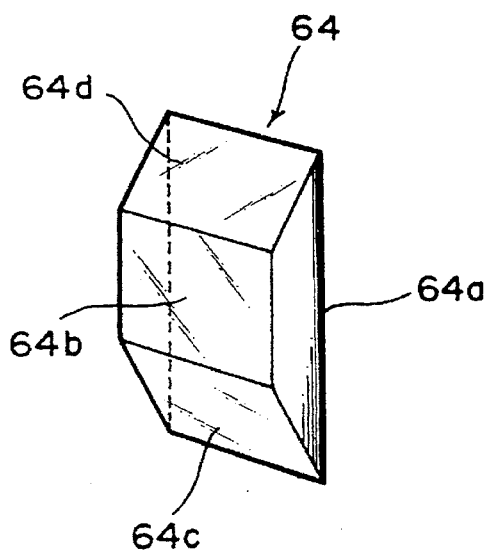
FIG. 7 is a perspective view of a trapezoidal prism used in the fourth preferred embodiment.
Figure 8:
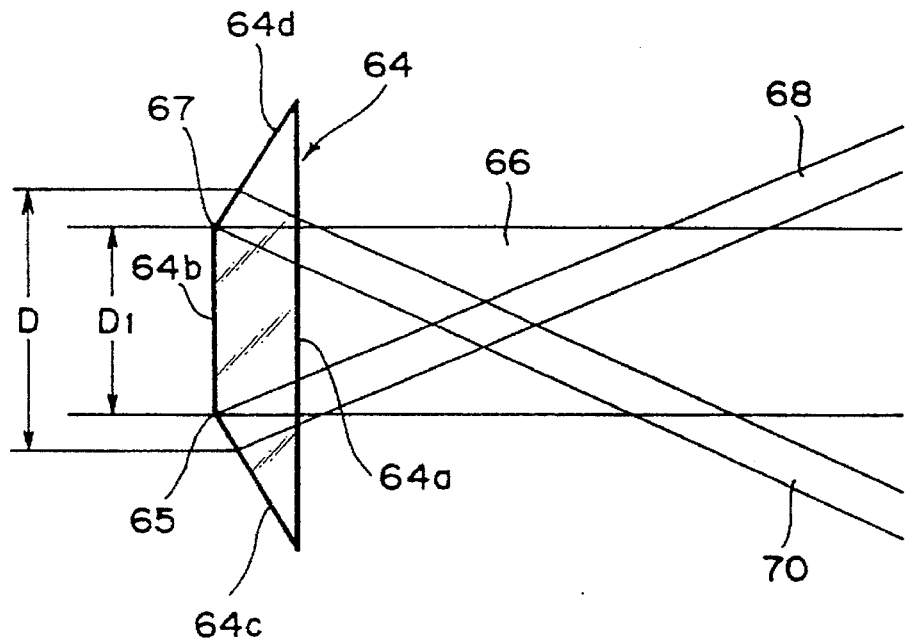
FIG. 8 is a view showing the relation between the beam diameter of signal light and the position of the trapezoidal prism.

As shown in FIG. 7, the trapezoidal prism 64 has a bottom surface 64a, a top surface 64b parallel to the bottom surface 64a, and a pair of inclined surfaces 64c and 64d connecting the bottom surface 64a and the top surface 64b. Referring to FIG. 8, there is shown the relation between the beam diameter D of the signal light beam and the position of the prism 64. Of the signal light beam having the beam diameter D, a central signal light beam portion having a beam diameter $D_1$ incident on the top surface 64b of the prism 64 is straight transmitted through the prism 64 to become a principal signal light beam 66.

On the other hand, the other peripheral signal light beam portions incoming to the outside of edges 65 and 67 of the prism 64 are refracted at the inclined surfaces 64c and 64d, respectively, and are emerged from the prism 64 as refracted beams 68 and 70, respectively. Thus, the signal light beam can be split into the three components by using the trapezoidal prism 64 having a predetermined size in relation to the beam diameter D of the signal light beam. Also in this preferred embodiment, the tilt angle of a dielectric multilayer film filter 14 is changed according to the difference in intensity between the refracted beams 68 and 70 respectively detected by photodiodes 32 and 34 so that the center wavelength in the passband of the dielectric multilayer film filter 14 comes into coincidence with the center wavelength of the signal light beam.

Figure 9:
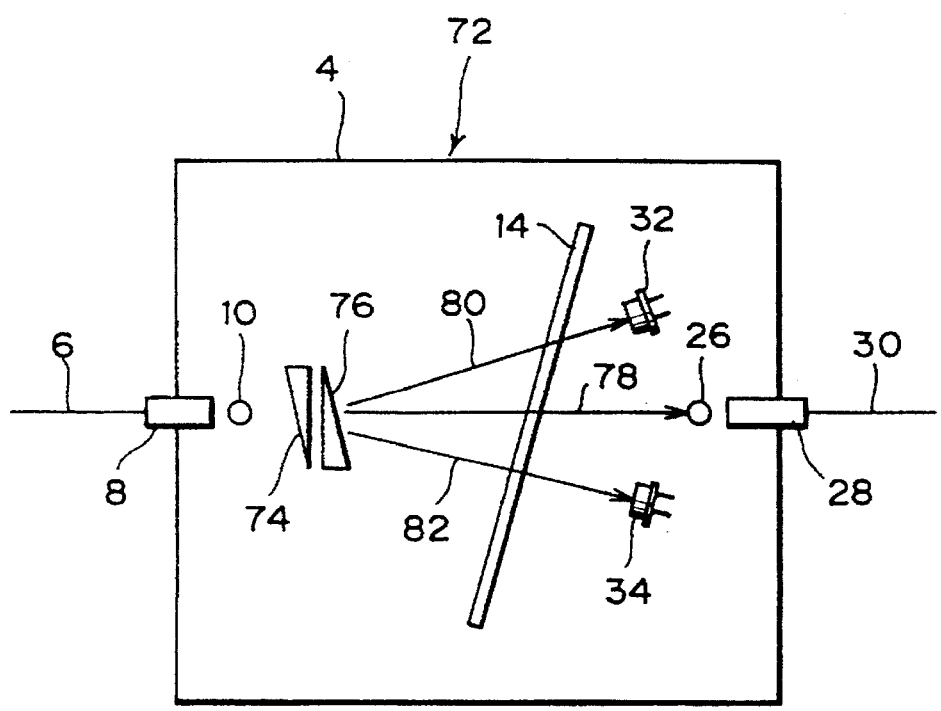
FIG. 9 is a schematic illustration of a fifth preferred embodiment of the present invention.

Referring to FIG. 9, there is shown a schematic illustration of a tunable filter module 72 according to a fifth preferred embodiment of the present invention. This preferred embodiment employs a first birefringent crystal wedge plate 74 and a second birefringent crystal wedge plate 76 in combination to split a signal light beam into three components. The first birefringent crystal wedge plate 74 and the second birefringent crystal wedge plate 76 have the same wedge angle, and they are placed in the optical path of the signal light beam so that the wedges of the wedge plates 74 and 76 are oriented in opposite directions.

Figure 10:
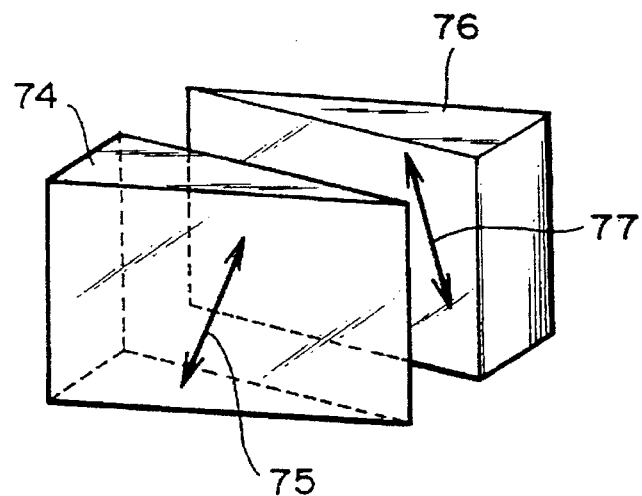
FIG. 10 is a perspective view showing the orientation of optic axes of a pair of birefringent wedge plates used in the fifth preferred embodiment.

As shown in FIG. 10, an optic axis 75 of the first birefringent crystal wedge plate 74 is oriented in relation to an optic axis 77 of the second birefringent crystal wedge plate 76. Preferably, the angle formed by the optic axis 75 and the optic axis 77 is set to about 5° to about 15°, so as to increase the proportion of a principal signal beam 78 emerging from the second birefringent crystal wedge plate 76 and reduce the proportion of split beams 80 and 82 emerging from the second birefringent crystal wedge plate 76.

Figure 11:
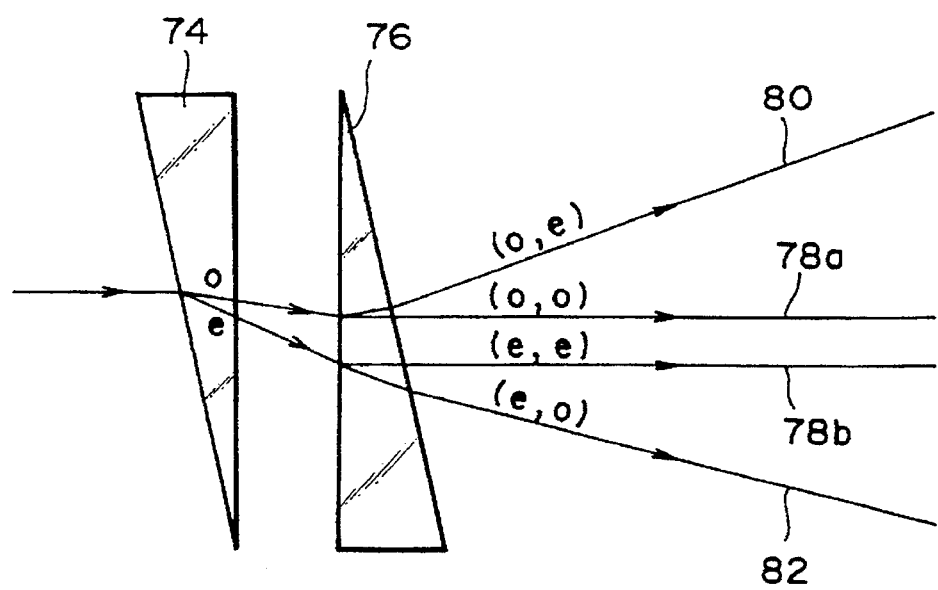
FIG. 11 is a view showing the optical paths of an ordinary ray and an extraordinary ray emerging from the birefringent wedge plates.

There will now be described the optical path of the signal light beam when the first and second birefringent crystal wedge plates 74 and 76 are placed in the optical path with reference to FIG. 11. First, the signal light beam is split into an ordinary ray (o) and an extraordinary ray (e) by the first birefringent crystal wedge plate 74. The ordinary ray component emerging from the first birefringent crystal wedge plate 74 is next split into an ordinary ray 78a and an extraordinary ray 80 by the second birefringent crystal wedge plate 76. On the other hand, the extraordinary ray component emerging from the first birefringent crystal wedge plate 74 is next split into an extraordinary ray 78b and an ordinary ray 82 by the second birefringent crystal wedge plate 76.

As mentioned above, the first and second birefringent crystal wedge plates 74 and 76 have the same wedge angle, and they are placed in the optical path so that the wedges of the wedge plates 74 and 76 are oriented in opposite directions. Accordingly, when the emergent beam from the second birefringent crystal wedge plate 76 is an ordinary ray for both the first and second wedge plates 74 and 76 or an extraordinary ray for both the first and second wedge plates 74 and 76, refraction by the wedge plates 74 and 76 is canceled to obtain the undeviated emergent beams 78a and 78b. On the other hand, when the emergent beam from the second birefringent crystal wedge plate 76 is an ordinary ray for the first wedge plate 74 and an extraordinary ray for the second wedge plate 76, the emergent beam 80 is refracted obliquely upward as shown in FIG. 11. Further, when the emergent beam from the second birefringent crystal wedge plate 76 is an extraordinary ray for the first wedge plate 74 and an ordinary ray for the second wedge plate 76, the emergent beam 82 is refracted obliquely downward as shown in FIG. 11.

The undeviated beams 78a and 78b contain different polarized light components mixed together, so that the principal signal beam 78 as a whole has no polarization dependence. Although the refracted beams 80 and 82 have polarization dependence, it is possible to assemble a system that can neglect the polarization dependence. For example, a polarization scrambler may be placed in the optical paths of the beams 80 and 82 to continuously rotate a polarized wave. At this time, if the time span of rotation is longer than the period of rotation, the polarization dependence can be neglected.

The first and second birefringent crystal wedge plates 74 and 76 may be formed of any material selected from all of general birefringent crystals. However, in considering applications to communication, rutile is preferably adopted from the viewpoints of magnitude of birefringence and stability of material. However, rutile exhibits large birefringence and has large indices of refraction ($n_e$=2.7, $n_o$=2.4), which are largely different from those of glass (n=1.5) and optical adhesive (n=1.55). In intending to bond glass and birefringent crystal, or bond birefringent crystals together by using adhesive for the convenience of mounting, calcite is preferably used.

Further, lithium niobate ($LiNbO_3$) most mass-produced as an optical birefringent crystal may also be used to improve the mass productivity. Of course, any other crystals such as lithium tantalate ($LiTaO_3$) and tellurium dioxide may also be used.

Although not shown in FIG. 9, this preferred embodiment also employs a comparator, drive circuit, and a microactuator respectively similar to the comparator 36, the drive circuit 38, and the microactuator 40 shown in FIG. 1. Also in this preferred embodiment, the tilt angle of the dielectric multilayer film filter 14 is changed according to the difference in intensity between the refracted beams 80 and 82 respectively detected by the photodiodes 32 and 34 so that the center wavelength in the passband of the dielectric multilayer film filter 14 comes into coincidence with the center wavelength of the signal light beam.

Figure 12:
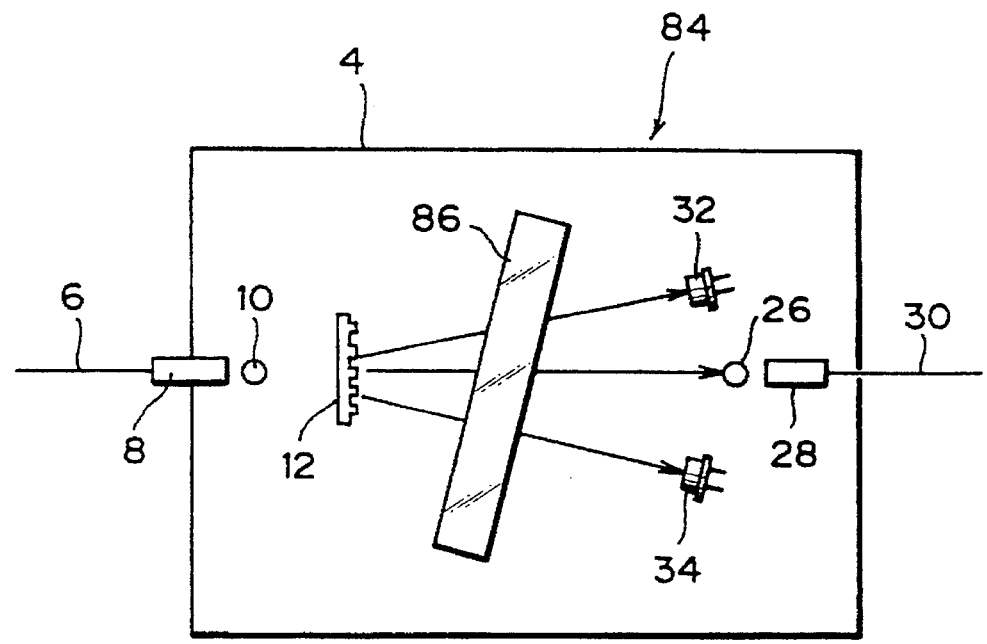
FIG. 12 is a schematic illustration of a sixth preferred embodiment of the present invention.

Referring to FIG. 12, there is shown a schematic illustration of a tunable filter module 84 according to a sixth preferred embodiment of the present invention. This preferred embodiment employs a Fabry-Perot interferometer 86 as a wave filter. The other configuration in this preferred embodiment is similar to that in the first preferred embodiment shown in FIG. 1. Although not shown in FIG. 12, this preferred embodiment also employs a comparator, a drive circuit, and a microactuator respectively similar to the comparator 36, the drive circuit 38, and the microactuator 40 shown in FIG. 1.

The Fabry-Perot interferometer 86 provides a narrow-band filter configured, for example, by forming films having appropriate transmittances on the opposite surfaces of a glass plate to interfere beams. It is known that the center wavelength in the passband of the narrow-band filter can be changed by slightly changing the angle of incidence.

Figure 13:
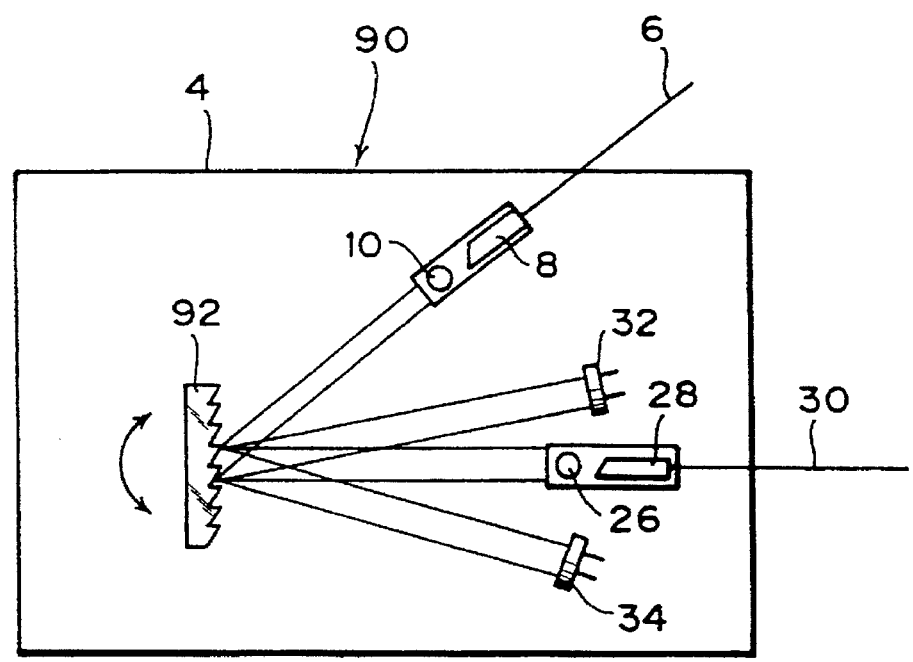
FIG. 13 is a schematic illustration of a seventh preferred embodiment of the present invention.

Referring to FIG. 13, there is shown a schematic illustration of a tunable filter module 90 according to a seventh preferred embodiment of the present invention. This preferred embodiment employs a reflection type diffraction grating 92 designed to be swung or rotated to change a relative angle between the diffraction grating 92 and an output port (output fiber 30) so that the center wavelength of a diffracted light beam component coupled to the output port comes into coincidence with the center wavelength of a signal light beam.

Figure 14:
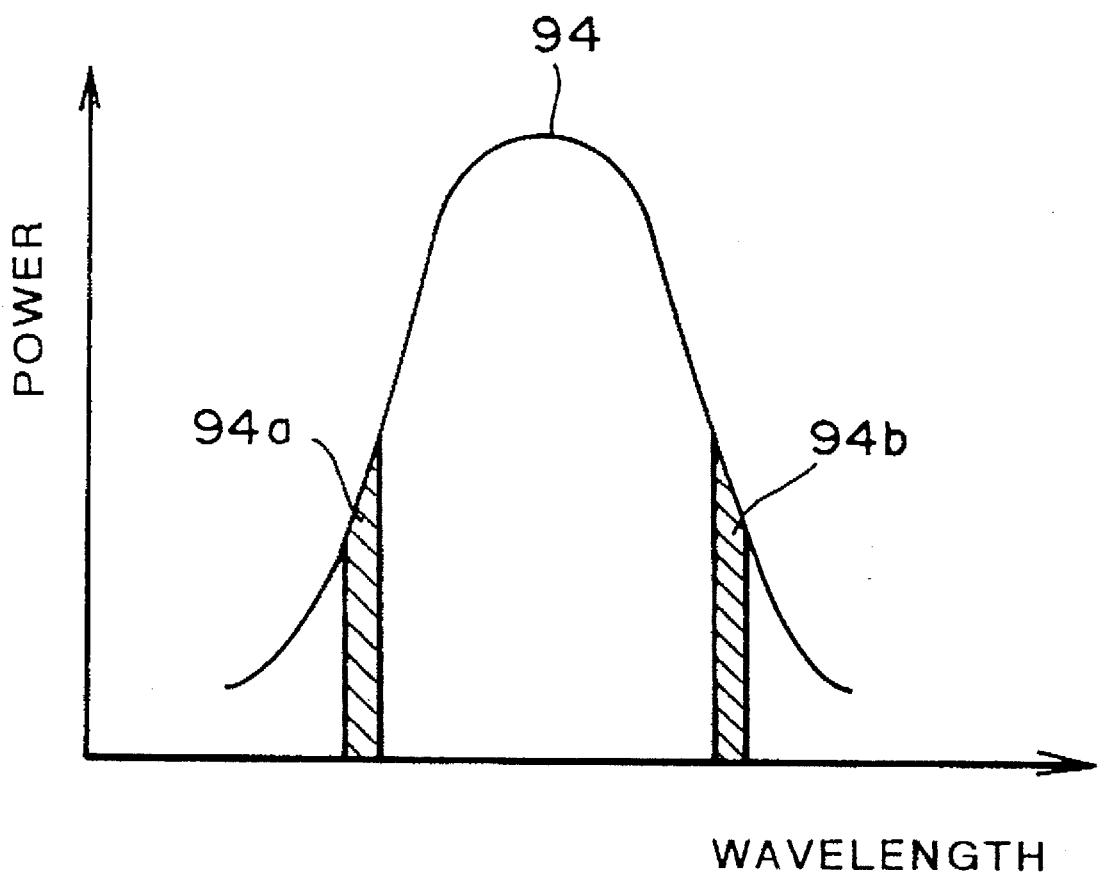
FIG. 14 is a graph showing the spread of wavelength of a diffracted light beam in the seventh preferred embodiment.

The diffraction grating 92 has about 1200 to 2400 grooves per millimeter. As shown in FIG. 14, a diffracted light beam 94 emerged from the diffraction grating 92 has a certain spread of wavelength. A photodiode 32 is located so as to detect a segment 94a of the diffracted light beam 94, and a photodiode 34 is located so as to detect a segment 94b of the diffracted light beam 94. Outputs from the photodetectors 32 and 34 are compared by a comparator (not shown), and the diffraction grating 92 is rotated according to a differential signal indicative of the difference between these outputs so that the center wavelength of the diffracted light beam component coupled to the output port comes into coincidence with the center wavelength of the signal light beam.

According to the present invention as described above, it is possible to provide a tunable filter module which can automatically make the center wavelength in the passband coincident with the center wavelength of a signal light beam according to variations in wavelength of the signal light beam.

What is claimed is:

1. A tunable filter module comprising:

beam splitting means for splitting an incident signal light beam into a first beam undeviated, a second beam deflected to one side of said first beam, and a third beam deflected to another side of said first beam;

a multilayer film filter located so as to transmit said first beam, said second beam, and said third beam;

a first photodetector located so as to detect said second beam;

a second photodetector located so as to detect said third beam;

a comparator connected to said first and second detectors, for comparing outputs from said first and second detectors and outputting a differential signal indicative of a difference between said outputs;

an actuator for moving said multilayer film filter; and driving means for driving said actuator according to said differential signal so that a center wavelength in a passband of said multilayer film filter comes into coincidence with a center wavelength of said signal light beam.

2. A tunable filter module according to claim 1, wherein said beam splitting means comprises a transmission type diffraction grating.

3. A tunable filter module according to claim 2, wherein said first beam is a zero-order light beam emerged from said transmission type diffraction grating; said second beam is a plus first-order diffracted light beam emerged from said transmission type diffraction grating; and said third beam is a minus first-order diffracted light beam emerged from said transmission type diffraction grating.

4. A tunable filter module according to claim 1, wherein said beam splitting means comprises a trapezoidal prism having a bottom surface, a top surface parallel to said bottom surface, and first and second inclined surfaces connecting said bottom surface and said top surface;

said trapezoidal prism being located so that said top surface is opposed to said signal light beam at substantially right angles thereto, and having a size such that said first and second inclined surfaces are partially placed in an optical path of said signal light beam.

5. A tunable filter module according to claim 4, wherein a portion of said signal light beam transmitted through said top surface becomes said first beam; a portion of said signal light beam refracted at said first inclined surface becomes said second beam; and a portion of said signal light beam refracted at said second inclined surface becomes said third beam.

6. A tunable filter module according to claim 1, wherein said beam splitting means comprises a first birefringent wedge plate having a first wedge angle, and a second birefringent wedge plate having a second wedge angle equal to said first wedge angle and located so that wedges of said first and second birefringent wedge plates are oriented in opposite directions.

7. A tunable filter module according to claim 6, wherein said first and second birefringent wedge plates are formed of rutile.

8. A tunable filter module according to claim 6, wherein said first and second birefringent wedge plates are formed of calcite.

9. A tunable filter module according to claim 6, wherein said first and second birefringent wedge plates are formed of lithium niobate.

10. A tunable filter module according to claim 1, wherein said multilayer film filter is located obliquely with respect to an optical path of said signal light beam, and a tilt angle of said multilayer film filter with respect to said optical path is changed by said actuator to thereby change the center wavelength of the passband of said multilayer film filter.

11. A tunable filter module according to claim 1, wherein said multilayer film filter is fabricated so that wavelengths in the passband vary continuously with positions of said multilayer film filter, and said multilayer film filter is moved in a direction substantially perpendicular to an optical path of said signal light beam by said actuator to thereby change the center wavelength in the passband of said multilayer film filter.

12. A tunable filter module comprising:

beam splitting means for splitting an incident signal light beam into a first beam undeviated, a second beam deflected to one side of said first beam, and a third beam deflected to another side of said first beam;

a Fabry-Perot interferometer located obliquely with respect to an optical path of said signal light beam so as to transmit said first beam, said second beam, and said third beam;

a first photodetector located so as to detect said second beam;

a second photodetector located so as to detect said third beam;

a comparator connected to said first and second detectors, for comparing outputs from said first and second detectors and outputting a differential signal indicative of a difference between said outputs;

an actuator for changing a tilt angle of said Fabry-Perot interferometer with respect to said optical path; and driving means for driving said actuator according to said differential signal so that a center wavelength in a passband of said Fabry-Perot interferometer comes into coincidence with a center wavelength of said signal light beam.

13. A tunable filter module comprising:

beam splitting means for splitting an incident signal light beam into a first beam undeviated, a second beam deflected to one side of said first beam, and a third beam deflected to another side of said first beam;

a multilayer film filter located so as to transmit said first beam, said second beam, and said third beam;

a first fiber for propagating said first beam;

a second fiber located adjacent to said first fiber, for propagating said second beam;

a third fiber located adjacent to said first fiber and opposite to said second fiber, for propagating said third beam;

a first photodetector located at an output end of said second fiber, for detecting said second beam;

a second photodetector located at an output end of said third fiber, for detecting said third beam;

a comparator connected to said first and second detectors, for comparing outputs from said first and second detectors and outputting a differential signal indicative of a difference between said outputs;

an actuator for moving said multilayer film filter; and driving means for driving said actuator according to said differential signal so that a center wavelength in a passband of said multilayer film filter comes into coincidence with a center wavelength of said signal light beam.

14. A tunable filter module according to claim 13, wherein said first fiber is a single-mode optical fiber, and said second and third fibers are multi-mode optical fibers.

15. A tunable filter module comprising:

a diffraction grating for diffracting an incident signal light beam to output a diffracted beam;

an output port located so as to be coupled to a center-wavelength component of said diffracted beam;

a first photodetector located so as to detect a shorter-wavelength component of said diffracted beam;

a second photodetector located so as to detect a longer-wavelength component of said diffracted beam;

a comparator connected to said first and second detectors, for comparing outputs from said first and second detectors and outputting a differential signal indicative of a difference between said outputs;

an actuator for swinging said diffraction grating with respect to said signal light beam; and driving means for driving said actuator according to said differential signal so that a center wavelength of said diffracted beam coupled to said output port comes into coincidence with a center wavelength of said signal light beam.

* * * * *